(12) United States Patent
Carter et al.

(10) Patent No.: US 7,837,168 B2
(45) Date of Patent: Nov. 23, 2010

(54) MOUNTING DEVICE AND METHOD FOR POSITIONING A MOTOR WITHIN AN IMAGE FORMING APPARATUS

(75) Inventors: Daniel L. Carter, Georgetown, KY (US); Harald Portig, Versailles, KY (US); Brian Reed Spencer, Lexington, KY (US); Joseph Edwin Domhoff, Shelbyville, KY (US); David W. Hunter, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 294 days.

(21) Appl. No.: 11/693,775

(22) Filed: Mar. 30, 2007

(65) Prior Publication Data

US 2008/0238231 A1    Oct. 2, 2008

(51) Int. Cl.
*A47H 1/10* (2006.01)
(52) U.S. Cl. .................. 248/300; 248/637; 248/674
(58) Field of Classification Search ............. 248/300, 248/637, 674; 320/89, 52, 51; 411/199, 411/198, 120
See application file for complete search history.

(56) References Cited

U.S. PATENT DOCUMENTS

| | | | | |
|---|---|---|---|---|
| 2,786,107 | A | * | 3/1957 | Grace ..................... 200/61.54 |
| 2,830,752 | A | * | 4/1958 | Wentling ................... 417/354 |
| 3,323,763 | A | * | 6/1967 | Butts ......................... 248/606 |
| 3,634,790 | A | * | 1/1972 | Turteltaub ................. 333/222 |
| 5,521,447 | A | * | 5/1996 | Bertolini et al. ............. 310/51 |
| 5,799,548 | A | | 9/1998 | Brooks et al. |
| 5,920,986 | A | | 7/1999 | Brooks et al. |
| 6,050,890 | A | * | 4/2000 | Bayer et al. ................ 454/120 |
| 2006/0029485 | A1 | * | 2/2006 | Weinstein .................. 411/121 |

* cited by examiner

*Primary Examiner*—Amy J Sterling

(57) ABSTRACT

The application includes various embodiments of devices and methods for mounting a motor within an image forming apparatus. The motor is mounted on a frame and positioned to engage and drive a component within the image forming apparatus. In one embodiment, the component is an imaging unit. The frame includes an opening to receive the motor. A locating member is attached to the frame and extends into the opening to contact the motor and provide accurate positioning for engagement with the component. The locating ring provides for a press fit with lower forces. Additional fasteners may fixedly connect the motor to the frame and maintain the accurate positioning provided by the locating member.

7 Claims, 11 Drawing Sheets

MOUNTING DEVICE AND METHOD FOR POSITIONING A MOTOR WITHIN AN IMAGE FORMING APPARATUS

BACKGROUND

The present application is directed to devices and methods for positioning a motor within an image forming apparatus and, more specifically, to a locating member for creating an interference fit for positioning the motor within the image forming apparatus.

Image forming apparatus, such as printers, facsimile devices, copiers, and the like, include various motors. The motors are generally mounted on a frame and may be aligned within a locating opening in the frame. The motors include one or more gears that mesh with corresponding gears on components within the image forming apparatus. Activation of the motors drives the components during the image formation process. The mounting and positioning of the motor on the frame should be accurate such that the motor gears mesh with the corresponding gears on the driven components. The gears should include a good contact ratio to reduce gear noise during the image formation process and reduce wear such that the gears last the life of the image forming apparatus. The contact ratio is the average number of teeth in contact with each other at any time as the gears rotate.

An issue with accurate motor placement is the manufacturing tolerances with the various components. Each of the frame, motor, and gears may include some variations in the actual sizes. The variances in the components may add together to affect the overall tolerance of the gear mesh. The variation in the overall tolerance may be further aggravated because the components may be manufactured by different vendors. Devices and methods may be necessary to accommodate tolerances in the various elements and provide for good contact ratio.

SUMMARY

The present application is directed to embodiments of devices and methods for positioning a motor within an image forming apparatus. In one embodiment, the device includes a ring with an opening dimensioned to provide an interference fit with the motor. The ring may include slots that are spaced around the opening to provide slight expansion of the opening when the motor is inserted therein.

One embodiment of a method of positioning a motor within the image forming apparatus includes positioning the ring to receive the motor within the opening. During insertion of the motor, the slots are compressed thereby expanding a size of the opening to accommodate and locate the motor. The expanded ring applies a compressive force thereby forming an interference fit to maintain a position of the motor.

DETAILED DESCRIPTION

The various embodiments disclosed herein are directed to devices and methods for mounting a motor within an image forming apparatus. The motor is mounted on a frame and positioned to engage and drive a component within the image forming apparatus. The frame includes an opening to receive the motor. A locating member is attached to the frame and extends into the opening to contact the motor and provide accurate positioning for engagement with the component. Additional fasteners may fixedly connect the motor to the frame and maintain the accurate positioning provided by the locating member.

Figure 1:
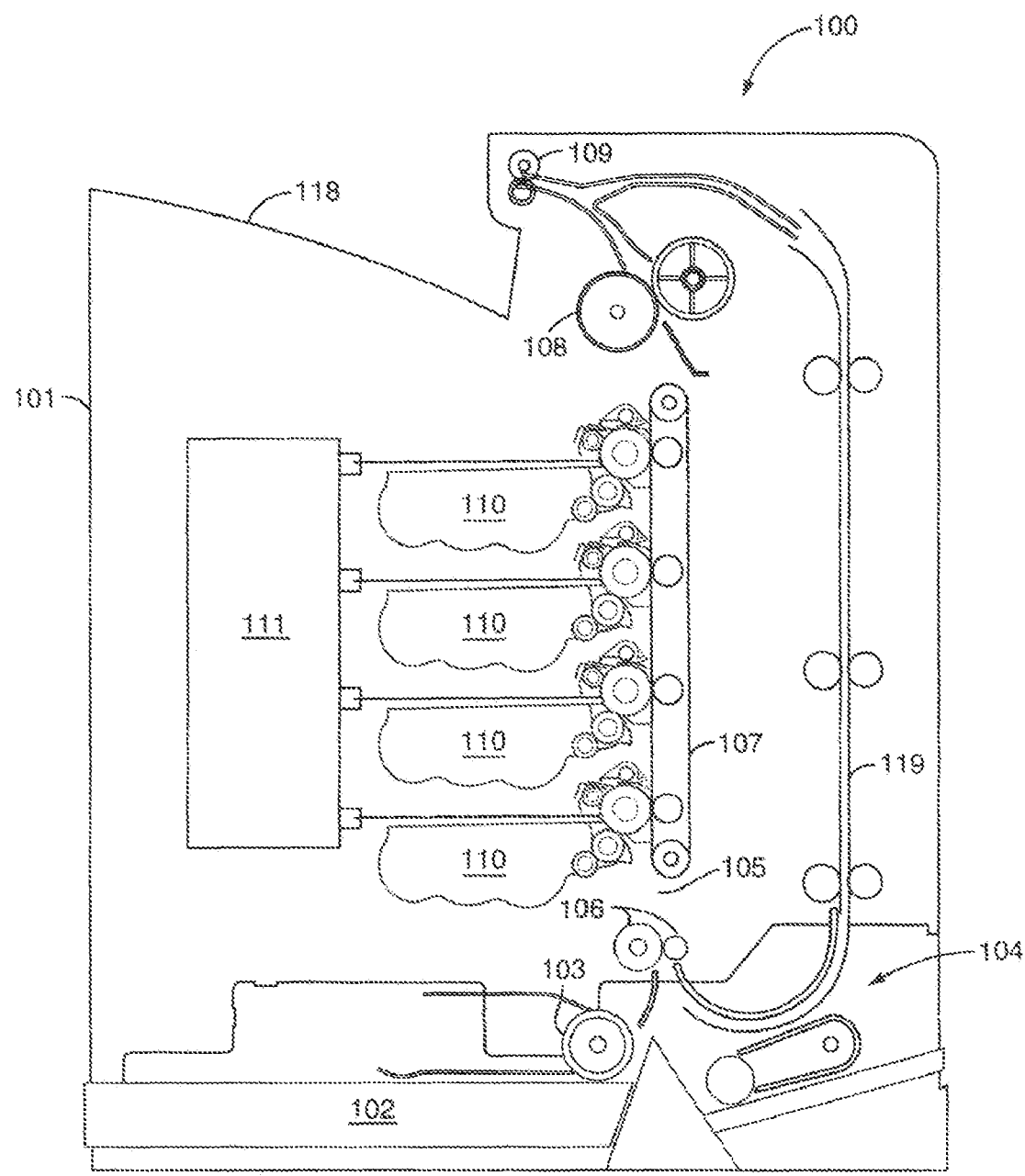
FIG. 1 is a schematic side view of an image forming apparatus according to one embodiment.

The frame forms the interior structure of an image forming apparatus and provides a base for mounting and positioning the various components that combine to form the device. Image forming apparatus may include a variety of architectures. FIG. 1 depicts a representative image forming apparatus 100. The image forming apparatus 100 comprises a main body 101 with a media tray 102 with a pick mechanism 103, or a manual input 104 for introducing media sheets. The media tray 102 is preferably removable for refilling, and located on a lower section of the device 100.

Media sheets are moved from the input and fed into a primary media path 105. One or more registration rollers 106 disposed along the media path 105 aligns the media sheets and precisely controls its further movement. A media transport belt 107 forms a section of the media path 105 for moving the media sheets past a plurality of image forming units 110. Color printers typically include four image forming units 110 for printing with cyan, magenta, yellow, and black toner to produce a four-color image on the media sheet.

An imaging device 111 forms an electrical charge on a photoconductive member within the image forming units 110 as part of the image formation process. The media sheet with loose toner is then moved through a fuser 108 that adheres the toner to the media sheet. Exit rollers 109 rotate in a forward or a reverse direction to move the media sheet to an output tray 118 or a duplex path 119. The duplex path 119 directs the inverted media sheet back through the image formation process for forming an image on a second side of the media sheet.

Figure 2:
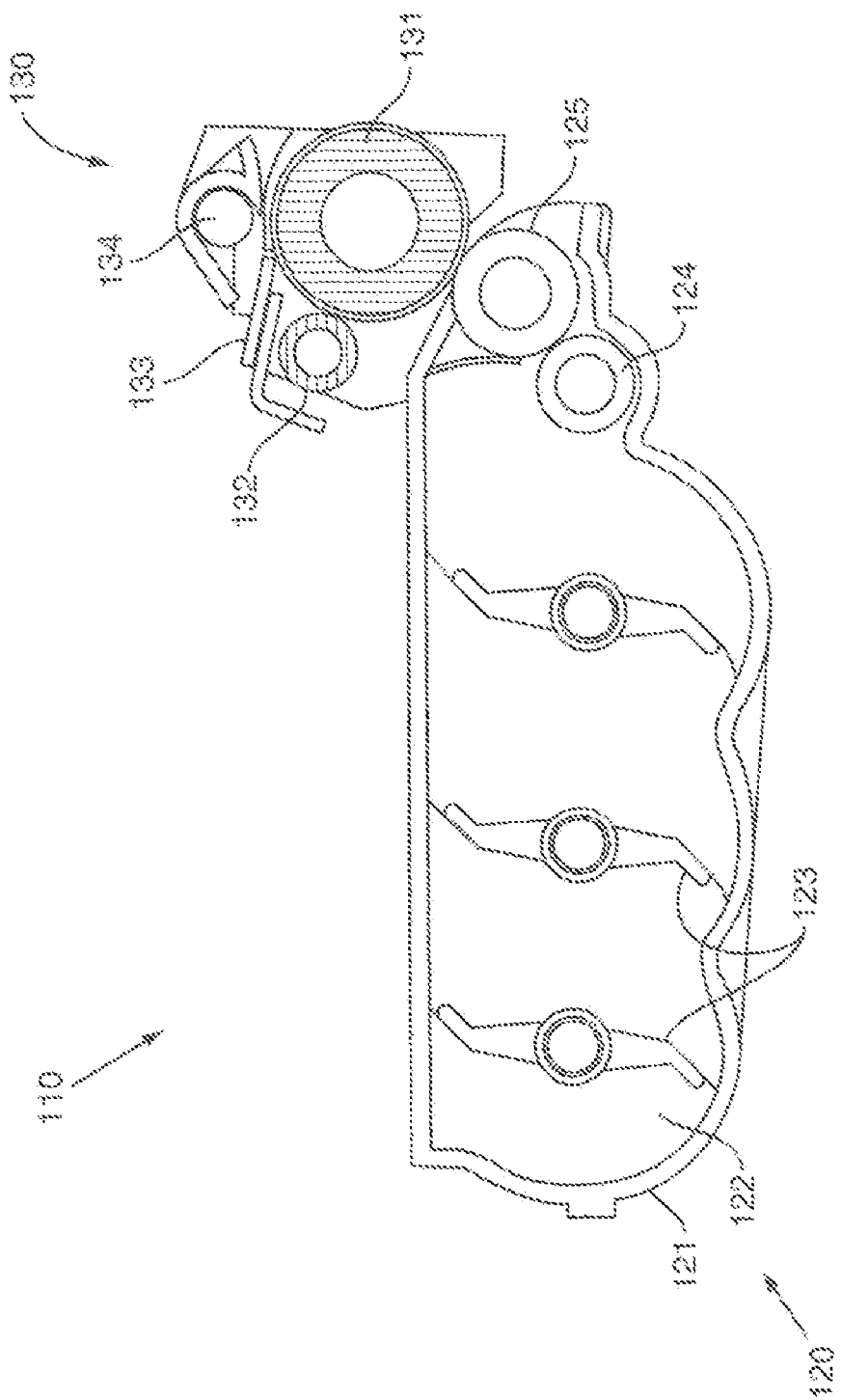
FIG. 2 is a sectional view of an imaging unit according to one embodiment.
Figure 3:
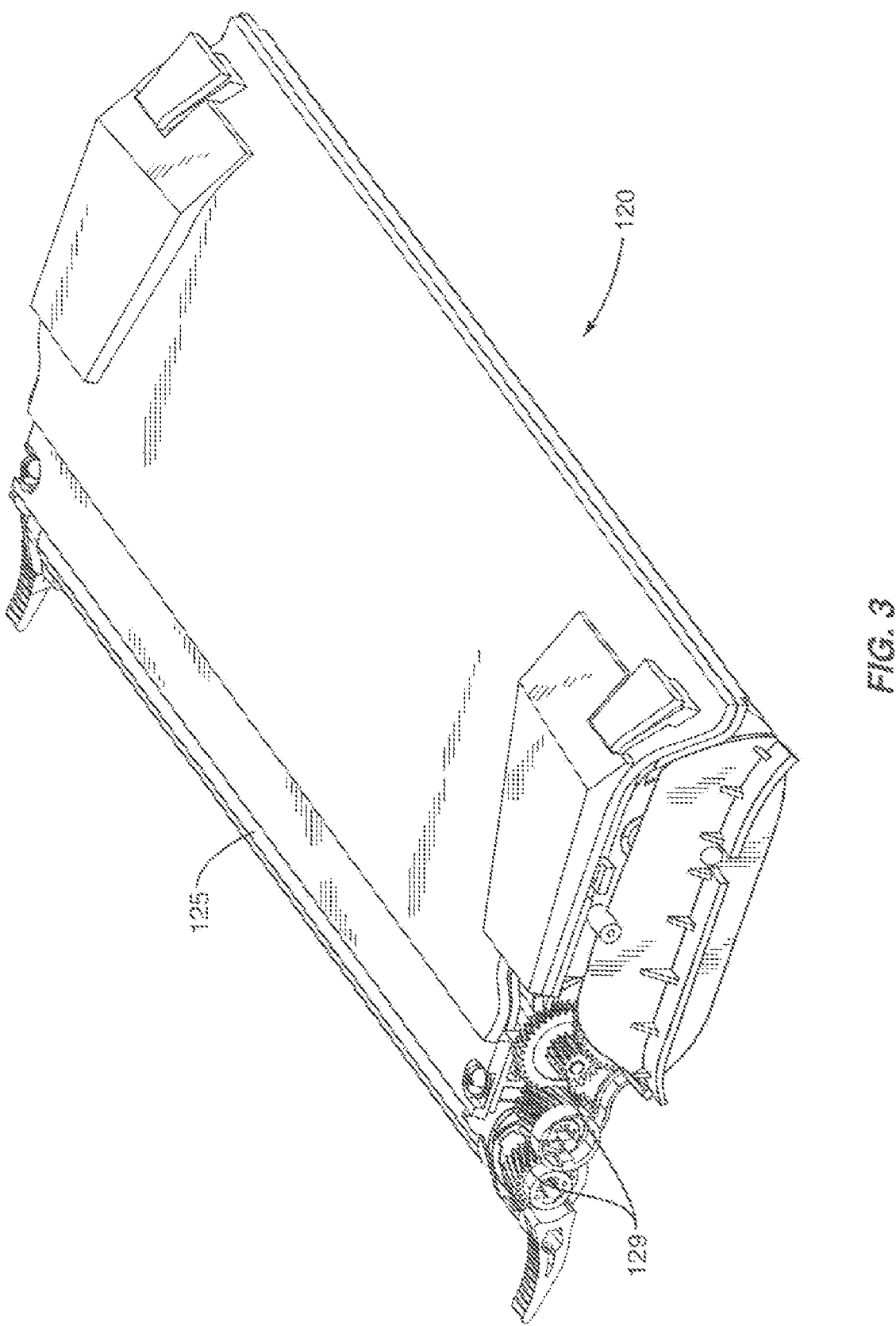
FIG. 3 is a perspective view of a developer unit according to one embodiment.

In one embodiment as illustrated in FIG. 2, the image forming units 110 are constructed of a developer unit 120 and a photoconductor unit 130. The developer unit 120 comprises an exterior housing 121 that forms a reservoir 122 for holding a supply of toner. One or more agitating members 123 are positioned within the reservoir 122 for agitating and moving the toner towards a toner adder roll 124 and a developer member 125. Toner moves from the reservoir 122 via one or more agitating members 123, to the toner adder roll 124, and finally is distributed to the developer member 125. FIG. 3 illustrates an exterior of the developer unit 120 that includes one or more gears 129. Gears 129 mesh with corresponding gears attached to the frame of the main body 101 to power the elements of the developer unit 120 and move the toner from the reservoir 122 to the developer member 125.

Figure 4:
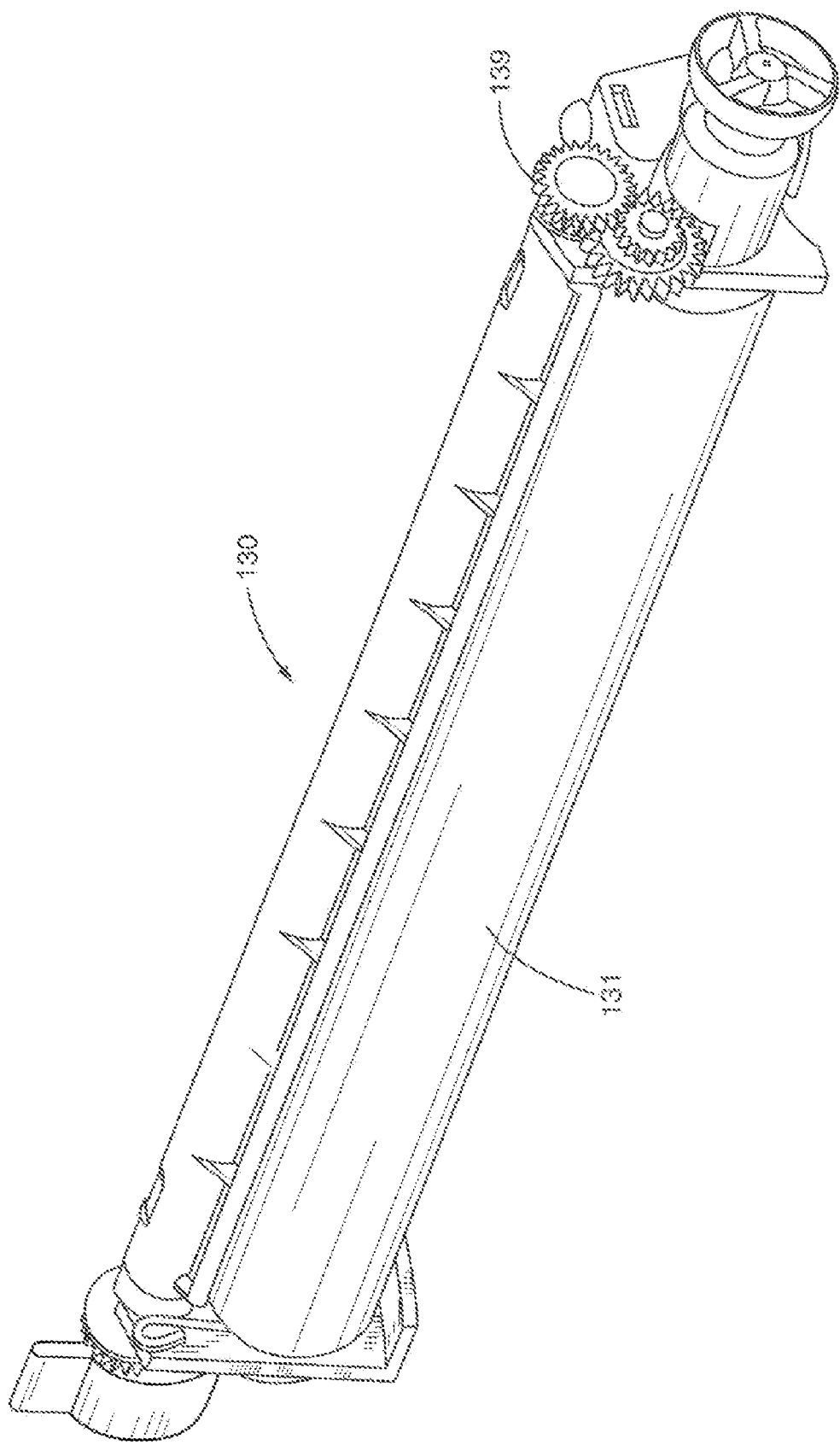
FIG. 4 is a perspective view of a photoconductor unit according to one embodiment.

The photoconductor unit 130 as best illustrated in FIG. 2 comprises the photoconductive member 131. In one embodiment, the photoconductive member 131 is an aluminum hollow-core drum coated with one or more layers of light-sensitive organic photoconductive materials. The photoconductor unit 130 may also include a charger 132 that applies an electrical charge to the photoconductive member 131 to receive an electrostatic latent image from the imaging device 111. A cleaner blade 133 contacts the surface of the photoconductive member 131 to remove residual toner that remains on the photoconductive member 131. The residual toner is moved to a waste toner auger 134 and moved out of the photoconductor unit 130. FIG. 4 illustrates an exterior view of the photoconductor unit 130 that includes gears 139 that mesh with corresponding gears on the frame of the body 101 to power the various elements.

Figure 5:
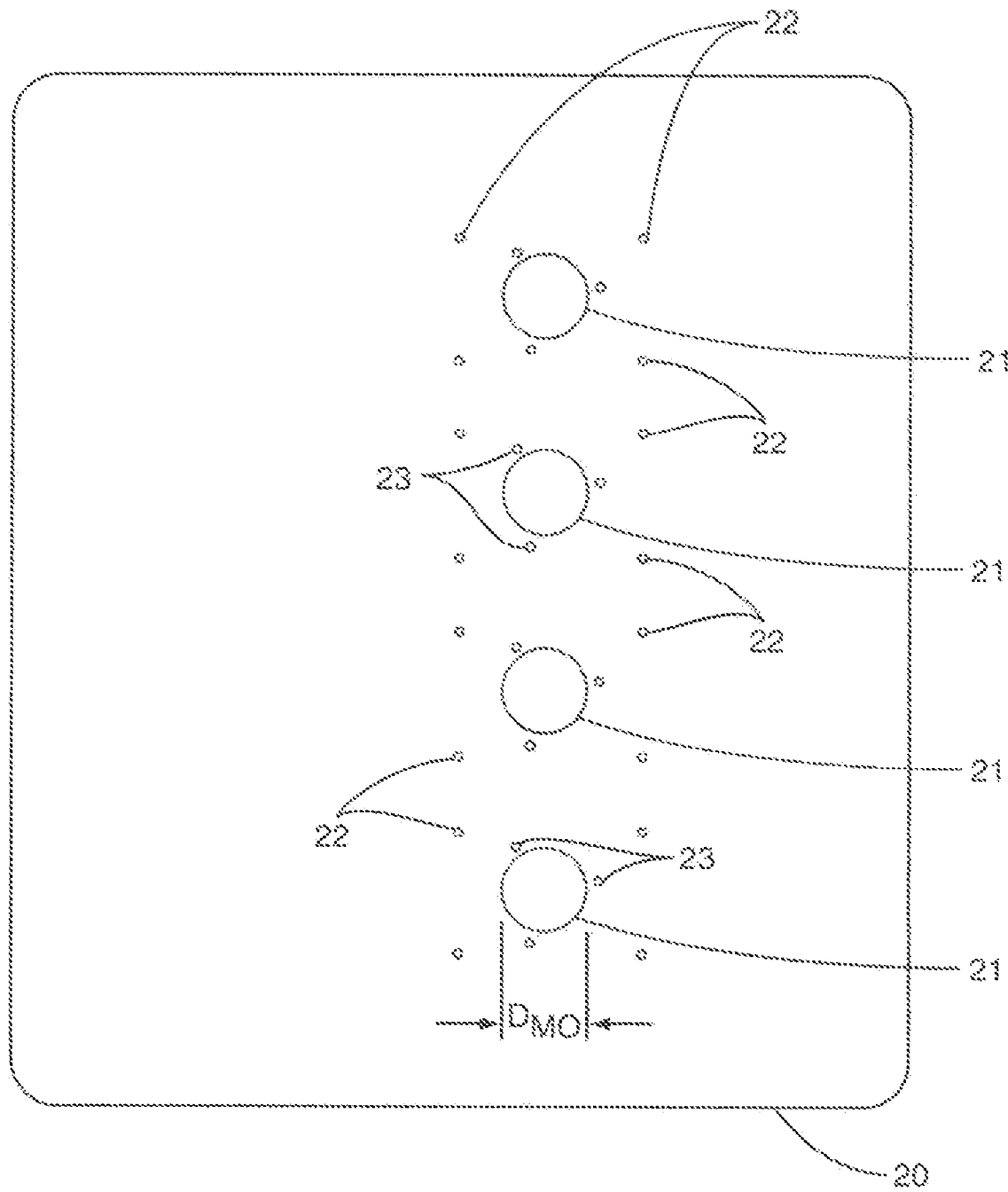
FIG. 5 is a schematic view of a frame with a plurality of mounting openings according to one embodiment.

FIG. 5 illustrates a side view of a section of the frame 20 that forms the interior structure of the main body 101. The frame 20 is positioned adjacent to the imaging units 110. Frame 20 provides a mounting platform for positioning a motor to engage one of the gears 129, 139 as will be explained in detail below. Frame 20 includes one or more mounting openings 21 each sized to mount a motor 30. In the embodiment of FIG. 5, frame 20 includes four separate mounting openings 21. Each of the mounting openings 21 includes a diameter $D_{MO}$ that is sized to position a motor 30 to engage one of the four imaging units 110. One or more fastener openings 22 are positioned adjacent to each of the mounting openings 21. The embodiment of FIG. 5 includes four fastener openings 22 for each mounting opening 21, although various other embodiments may include different numbers. Molding openings 23 may also be located in proximity to the mounting openings 21 for attaching the locating rings 40.

Figure 6:
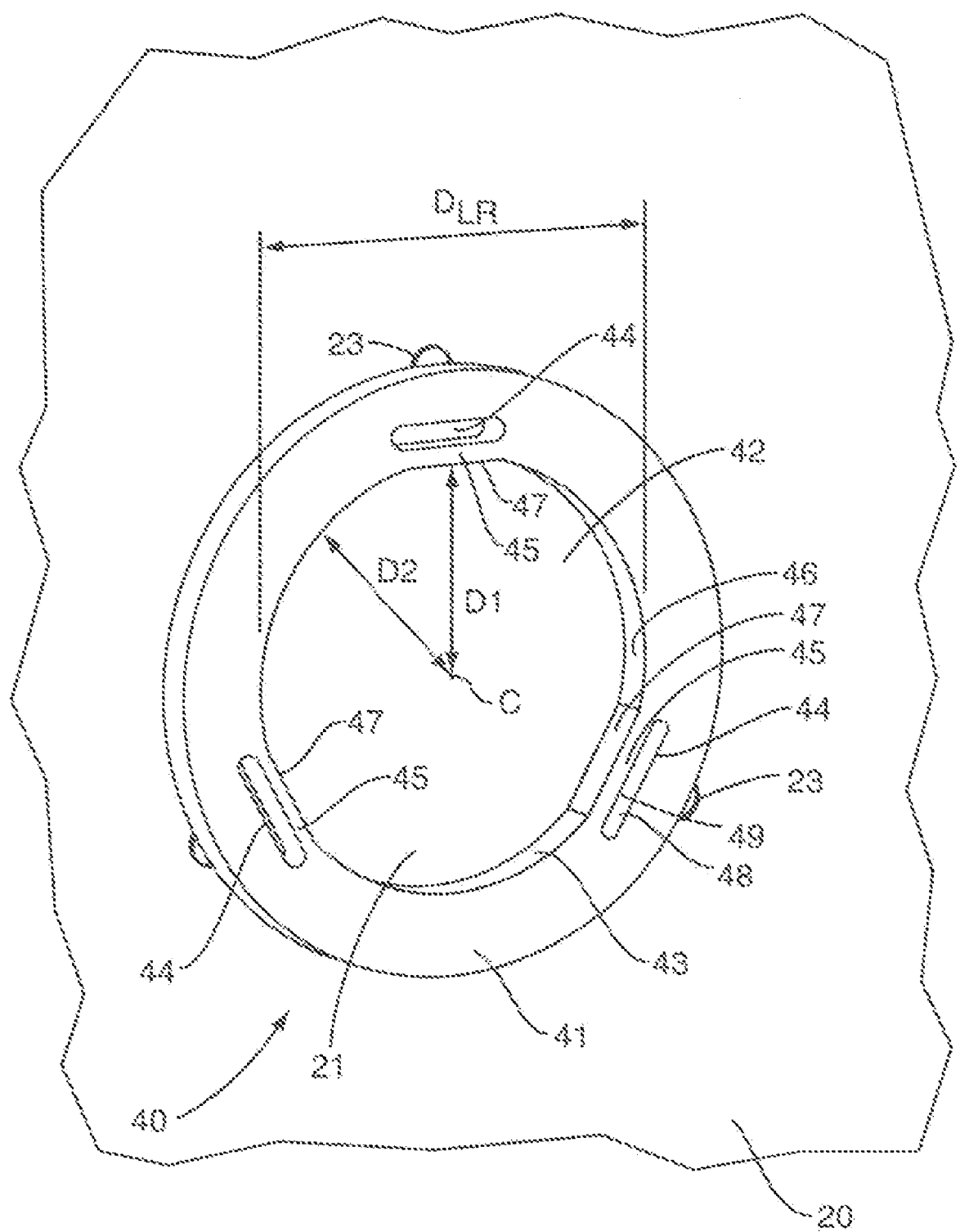
FIG. 6 is a perspective view of a locating member according to one embodiment.

A locating member 40 is attached to the frame 20 at each of the mounting openings 21. FIG. 6 illustrates a locating member 40 attached to a mounting opening 21 in the frame 20. The locating member 40 includes a body 41 with an opening 42 formed within an inner edge 43 and including an inner diameter $D_{LR}$. The inner diameter $D_{LR}$ is smaller than the diameter $D_{MO}$ such that the inner edge 43 is positioned inward from the mounting opening 21. The inner edge 43 may further include an installation lead 46 to facilitate insertion of the motor 30. Installation lead 46 includes an enlarged diameter that tapers inward to the smaller inner diameter $D_{LR}$.

Figure 14:
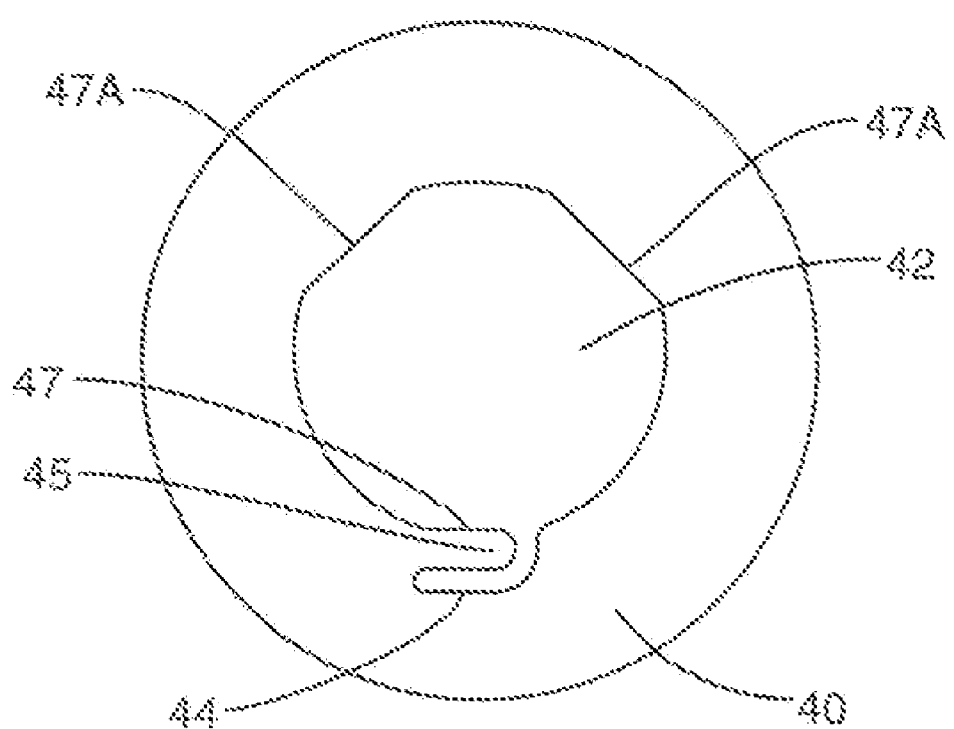
FIG. 14 is a front view of a locating member according to one embodiment.

One or more slots 44 are positioned around the periphery of the opening 42. The slots 44 extend through the locating member 40 and include an elongated shape. In one embodiment as illustrated in FIG. 6, the slots 44 are evenly spaced about the circumference of the locating member 40. FIG. 6 illustrates an embodiment with three slots 44 each positioned about 120° apart. Cords 45 are formed between the slots 44 and the inner edge 43. The cords 45 are positioned in proximity to the inner edge 43 and extend at least partially into the mounting opening 21. In one embodiment, the cords 45 are completely positioned into the mounting opening 21. The slots 44 may be completely surrounded by the locating member 40 as illustrated in FIG. 6, or may be connected with the opening 42 that includes a cantilever cord 45 as illustrated in the embodiment of FIG. 14.

Contact segments 47 are positioned along the inner edge 43 at each of the slots 44. A distance d1 from a centerpoint C of the opening 42 to the contact segments 47 is less than distance d2 from the centerpoint C to the remainder of the inner edge 43. In one embodiment, the contact segments 47 are substantially straight. Teach of the contact segments 47 may include substantially the same shape and length, or may be different. The contact segments 47 may include substantially the same length as the slots 44, or may include a smaller or larger length.

The locating member 40 may be attached to the frame 20 in a variety of different methods. In one embodiment, the locating member 40 is molded onto the frame 20. As illustrated in FIG. 5, the frame may 20 include one or more molding openings 23 that are positioned in proximity to the mounting openings 21. During the molding process, material that forms the locating member 40 flows through the molding openings 23 to provide secure attachment of the locating member 40 to the frame 20. U.S. Pat. Nos. 5,920,986 and 5,799,548 each disclose attachment of a member to a frame by a molding process and are herein incorporated by reference. Locating members 40 may also be attached to the frame 20 in various other manners including but not limited to adhesives, mechanical fasteners, heat staking, and press fitting.

In one embodiment, the locating member 40 is positioned within the mounting opening 21 in the frame 20. The locating member 40 includes an outer edge that contacts against the edge that forms the mounting opening 21. In another embodiment, the locating member 40 is positioned against a side of the frame 20 and may or may not extend into the opening 21.

The locating member 40 may be constructed from a variety of materials. Examples include but are not limited to acetal, nylon, urethane, rubber, and metal.

Figure 7:
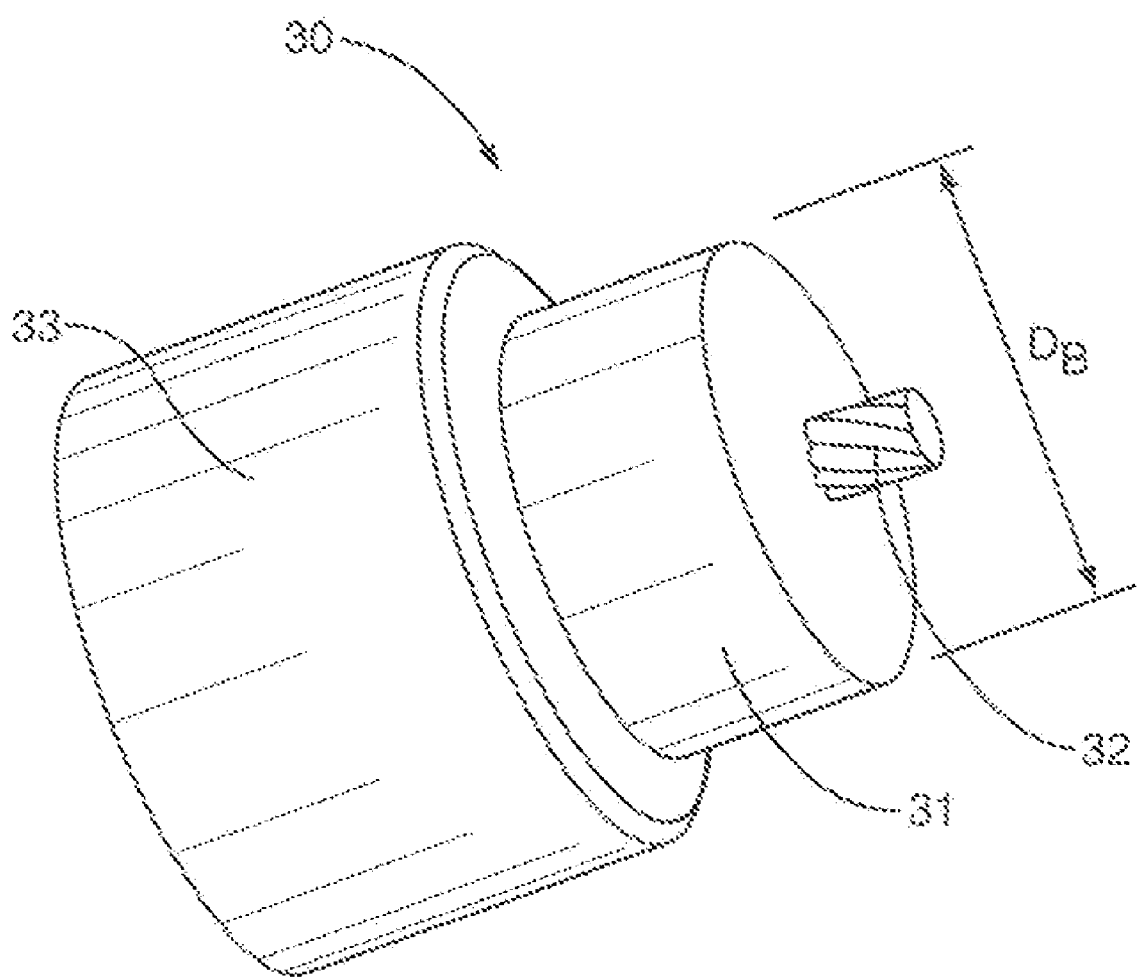
FIG. 7 is a perspective view of a motor according to one embodiment.
Figure 10:
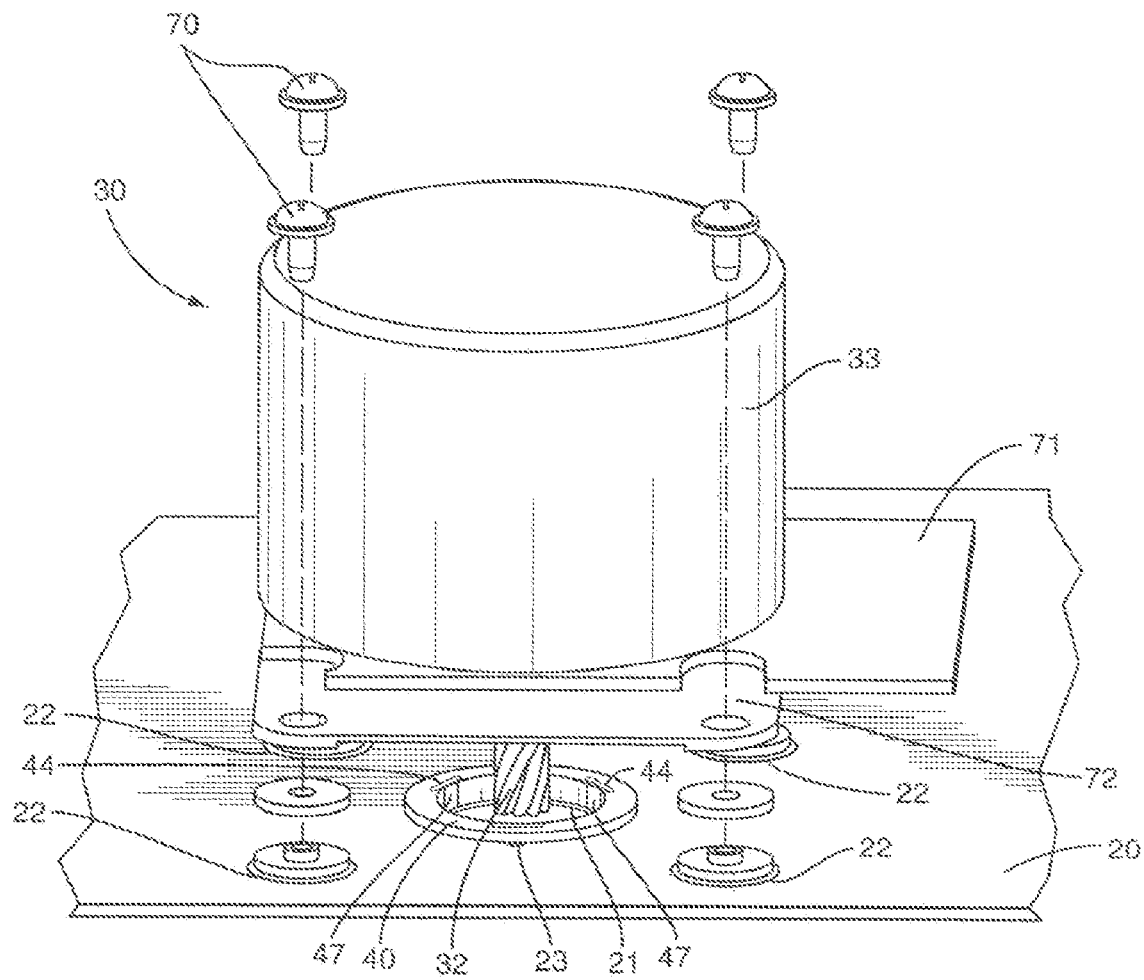
FIG. 10 is an exploded view of motor positioned adjacent to a frame with a locating member in the mounting opening according to one embodiment.

The motor 30 is attached to the frame 20 and accurately positioned by the locating member 40. FIG. 7 illustrates a perspective view of a motor 30 according to one embodiment. Motor 30 includes a body 31 with a gear 32 extending outward from one side. The gear 32 is sized to engage with one or both gears 129, 139 on the imaging units 110. In one embodiment, gear 32 engages directly with one or both gears 129, 139. In another embodiment, a gear train is positioned between the gear 32 and one or both gears 129, 139. The body 31 is sized to fit within the mounting opening 21 and position the gear 32 to engage with the imaging units 110. In one embodiment, body 31 includes a substantially circular cross-sectional shape with a diameter $D_B$. An outer casing 33 may be positioned over the body 31 as best illustrated in FIGS. 7 and 10.

Figure 8:
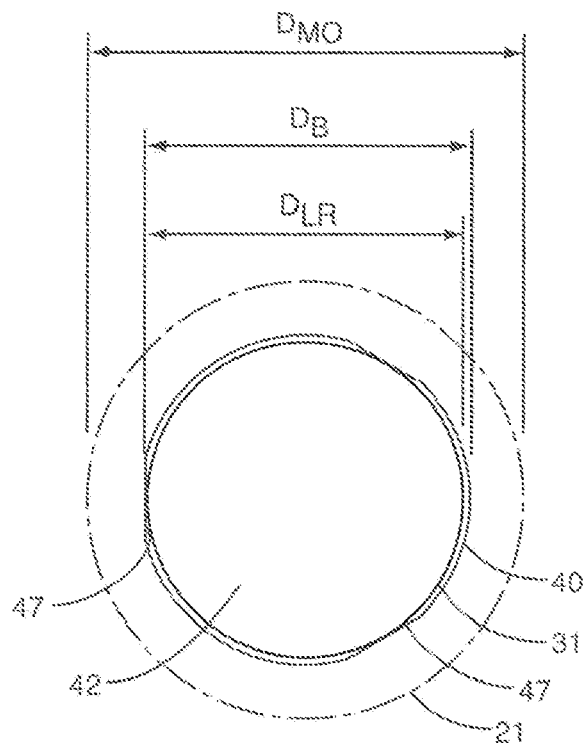
FIG. 8 is a schematic view of diameters of a mounting opening, motor body, and locating member according to one embodiment.

FIG. 8 schematically illustrates the sizes of the mounting opening 21, motor body 31, and locating member 40. The mounting opening 21 includes the largest diameter $D_{MO}$. The opening 42 of the locating member 40 includes a diameter $D_{LR}$ that is smaller than the diameter $D_{MO}$ of the mounting opening 21. The motor body 31 includes a diameter $D_B$ that is smaller than the mounting opening diameter $D_{MO}$ to allow the motor body 31 to fit within the mounting opening 21. The diameter $D_B$ is larger than the locating member diameter $D_{LR}$ causing the body 31 to contact and deform the locating member 40. The deformation provides a compressive force to form an interference fit between the motor body 31 and locating member 40. When mounted to the frame 20, the motor 30 contacts the locating member 40 and is positioned away from the edge of the mounting opening 21.

Figure 9:
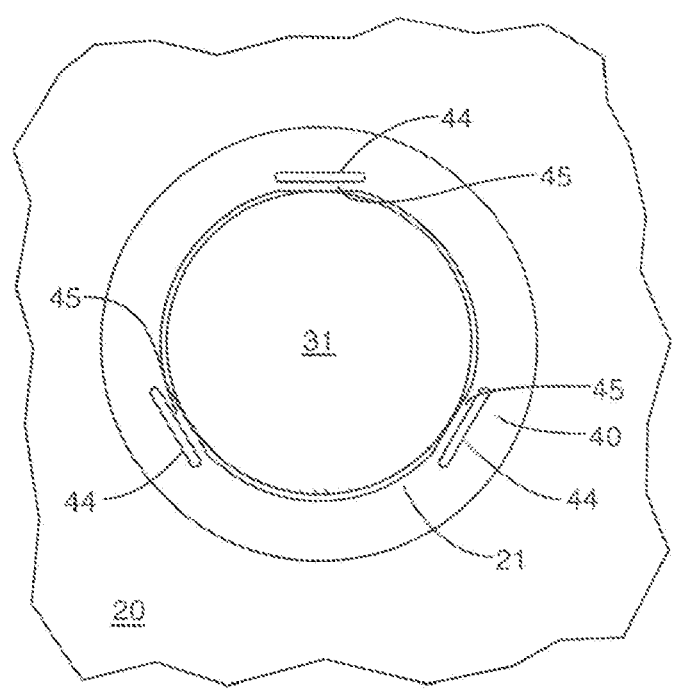
FIG. 9 is a sectional view of a motor body positioned adjacent to a locating member and frame according to one embodiment.

FIG. 9 illustrates a sectional view cut immediately above the surface of the frame 20. The motor body 31 is held in position by the interference fit with the locating member 40. The motor body 31 is in contact with the contact segments 47 of the locating member 40 and positioned away from the edge of the mounting opening 21. In one embodiment, the motor body 31 is only in contact with the contact segments 47 with the remainder of the inner edge 43 of the locating member 40 being spaced away from the motor body 31. The opening 42 of the locating member 40 is enlarged to receive the motor body 31. The enlargement of the opening 42 is accommodated by deformation of the slots 44. This deformation causes the cords 45 to move outward from the center of the opening 42 thereby enlarging the locating member diameter $D_{LR}$. The locating member 40 includes sufficient integrity to support the motor body 31 and space the motor body 31 away from the edge of the mounting opening 21. This interference fit provides for a more accurate positioning of the motor 30 to ensure engagement of the gear 32 with the imaging unit 110.

In one embodiment, each of the slots 44 are deformed a substantially equal amount. The equal deformation provides for the motor 30 to be centered within the opening 42. In one embodiment, the slots 44 are uniformly spaced around the periphery of the opening 42. The slots 44 result in a pressing force that is applied to the motor 30 to be less than a force from a solid locating member 40. The interference fit provides for more accurate placement of the motor 30 than a loose fit or conventional fit.

FIG. 10 illustrates the motor 30 being attached to the frame 20. The frame 20 includes the locating member 40 extending into the mounting opening 21. The motor 30 is moved into the frame 20 with the motor body 31 (not illustrated in FIG. 10) extending into the mounting opening 21. The motor body 31 contacts and is positioned relative to the frame 20 through the contact with the locating member 40. Once the motor 30 is positioned relative to the frame 20 by the locating member, fasteners 70 maintain the position and permanently attach the motor 30 to the frame 20. In one embodiment as illustrated in FIG. 10, plate 72 includes receptacles to receive the fasteners 70. The fasteners 70 contact the plate 72 and mount with the fastener openings 22 within the frame 20. An electrical card 71 may also be positioned at the motor 30.

Figure 11:
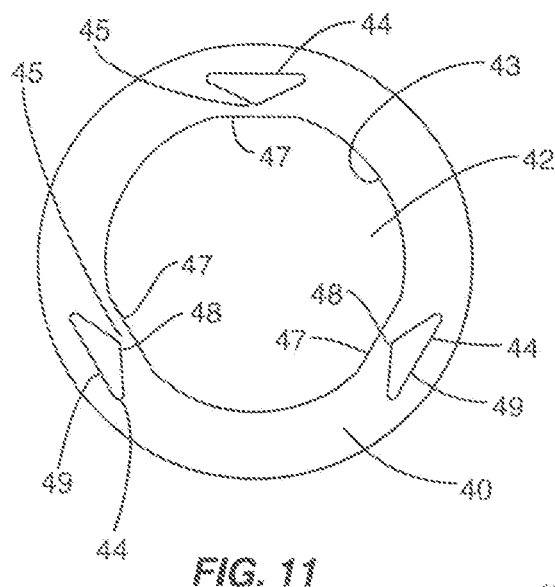
FIG. 11 is a front view of a locating member according to one embodiment.
Figure 12:
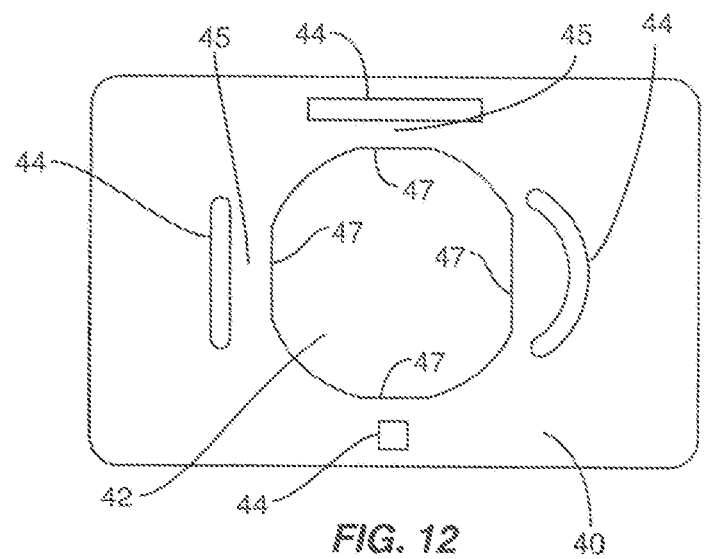
FIG. 12 is a front view of a locating member according to one embodiment.

The slots 44 on the locating member 40 may include different shapes and sizes. FIG. 6 illustrates an embodiment with the slot 44 including an outer side 48 and an inner side 49 that are substantially parallel. Each of the sides 48, 49 is also substantially straight. FIG. 11 illustrates another embodiment with slots 44 including an inner side 48 that includes a pair of angled sections that forms a substantially v-shape. The angled sections of the inner side 48 may provide for better moldability of the cords 45 formed between the inner side 48 and contact segments 47 on the inner edge 43 of the opening 42. The shape of the angled sections provides for better material flow into the area that forms the cords 45. Slots 44 of various other shapes and sizes may also be positioned within the locating member 40. FIG. 12 illustrates embodiments that include oval shaped, rectangular, and curved. Further, each of the slots 44 within the locating member 40 may be the same shape and size, or may include different shapes and/or sizes. The various sizes and shapes of the slots 44 further results in different sizes and shapes for the cords 45.

In one embodiment as illustrated in FIG. 6, one or more of the slots 44 are aligned with the molding openings 23 in the frame 20. This positioning provides strength and further prevents or reduces movement between the locating member 40 and the frame 20.

Figure 13:
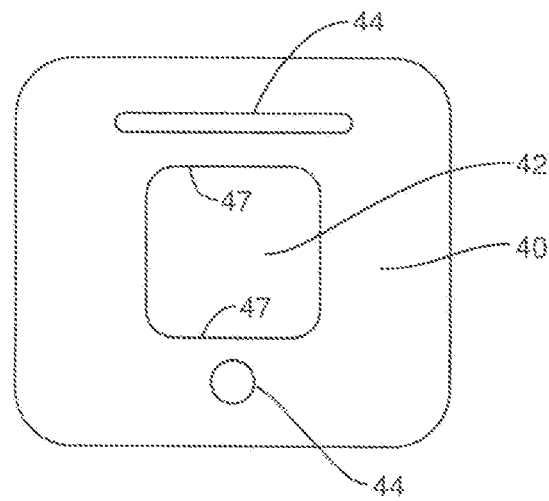
FIG. 13 is a front view of a locating member according to one embodiment.

The locating member 40 may include various shapes. FIGS. 6 and 11 illustrate a locating member 40 that is substantially circular. FIG. 12 illustrates a substantially rectangular member 40. Further, the opening 42 formed within the locating member 40 may include various shapes. FIGS. 6, 11, and 12 illustrate embodiments with substantially circular openings 42. FIG. 13 illustrates an embodiment with a substantially rectangular opening 42. In one embodiment, the opening 42 is offset (i.e., not centered) within the locating member 40.

FIG. 14 illustrates another embodiment of a locating member 40 that includes a single slot 44 and cord 45. In this embodiment, contact segments 47a are not associated with a corresponding slot 44. In this embodiment, a single slot 44 is positioned within the locating member 40.

The term "diameter" is used broadly used herein to a dimension of a geometric figure. Examples of geometric figures include but are not limited to circles, rectangles, hexagons, and octagons.

The locating member 40 may position a motor 30 for engaging with various components within the image forming apparatus 100. One embodiment includes the motor 30 engaging with an imaging unit 110. Motor 30 may also engage with other components including but not limited to the media transport belt 107, pick mechanism 103, registration rollers 106, fuser 108, and outlet rollers 109. These components may be permanently positioned within the image forming apparatus 100, or may be removable from the main body 101 such as during replacement or repair.

In one embodiment, the locating ring 40 is formed of metal. The metal locating ring 40 includes a spring construction to position motor 30 relative to the frame 20. In one embodiment, the locating ring 40 includes threads for attachment to the frame 20.

The term "image forming apparatus" and the like is used generally herein as a device that produces images on a media sheet. Examples include but are not limited to a laser printer, ink-jet printer, fax machine, copier, and a multi-functional machine.

The present invention may be carried out in other specific ways than those herein set forth without departing from the scope and essential characteristics of the invention. In one embodiment, the opening 42 is centrally located within the locating member 40. In another embodiment, the opening 42 is offset and not centered within the locating member 40. The present embodiments are, therefore, to be considered in all respects as illustrative and not restrictive, and all changes coming within the meaning and equivalency range of the appended claims are intended to be embraced therein.

What is claimed is:

1. A device to position a motor relative to a frame within an image forming apparatus, the device comprising:
    a ring including an inner edge and an opening, the opening dimensioned to provide an interference fit with the motor;
    a plurality of contact segments formed on a portion of the inner edge of the ring and protruding from the inner edge towards a centerpoint of the opening to contact the motor, the plurality of contact segments contacting the motor in a manner that a remainder portion of the inner edge is spaced away from the motor;
    a plurality of slots formed in the ring and uniformly spaced around the opening to provide slight expansion of the opening when the motor is inserted therein; and
    a plurality of cords each of which is formed in the ring between the plurality of slots and the contact segments of the ring, the cords being deformed towards the plurality of slots during insertion of the motor.

2. The device of claim 1, wherein the plurality of contact segments are substantially straight and positioned on the inner edge of the ring adjacent each of the plurality of slots, the plurality of contact segments being in closer proximity to the centerpoint of the opening than the remainder portion of the inner edge of the ring.

3. The device of claim 1, wherein the ring includes an outer edge that is substantially parallel with the inner edge.

4. The device of claim 1, wherein the opening includes the inner edge with first sections that are substantially circular and second sections that are substantially straight.

5. The device of claim 1, wherein the opening is substantially centered within the ring.

6. The device of claim 1, wherein at least one of the plurality of slots extends into the opening and includes a cantilevered cord.

7. The device of claim 1, wherein each of the plurality of slots includes an outer side positioned away from the opening and an inner side positioned towards the opening, the inner side including first and second sections with an angled orientation.

* * * * *